(12) United States Patent
Petrie et al.

(10) Patent No.: US 9,105,088 B1
(45) Date of Patent: Aug. 11, 2015

(54) IMAGE BLUR WITH PRESERVATION OF DETAIL

(71) Applicant: Google Inc., Mountain View, CA (US)

(72) Inventors: Ryan Petrie, Carnation, WA (US); Thor Carpenter, Kirkland, WA (US)

(73) Assignee: Google Inc., Mountain View, CA (US)

( * ) Notice: Subject to any disclaimer, the term of this patent is extended or adjusted under 35 U.S.C. 154(b) by 87 days.

(21) Appl. No.: 14/046,919

(22) Filed: Oct. 4, 2013

(51) Int. Cl.
*G06K 9/40* (2006.01)
*G06T 5/00* (2006.01)

(52) U.S. Cl.
CPC ........................................ *G06T 5/003* (2013.01)

(58) Field of Classification Search
CPC ................ G06T 11/00; G06T 2200/24; G06T 2207/20182; G06T 2207/20221; G06T 5/002; G06T 5/50; G06T 5/003; G06T 5/007; G06T 5/40; G06T 5/004; H04N 1/3872; H04N 1/46; G09G 5/377
USPC .......................................................... 382/255
See application file for complete search history.

(56) References Cited

U.S. PATENT DOCUMENTS

| | | | |
|---|---|---|---|
| 6,094,511 A | 7/2000 | Metcalfe et al. | |
| 7,432,939 B1 * | 10/2008 | Platzer et al. | 345/619 |
| 8,417,046 B1 | 4/2013 | McDougal et al. | |
| 2009/0003723 A1 | 1/2009 | Kokemohr | |
| 2009/0154828 A1 | 6/2009 | Levy et al. | |
| 2010/0189373 A1 | 7/2010 | Ayzenberg | |
| 2012/0219218 A1* | 8/2012 | Demandolx | 382/168 |
| 2013/0230224 A1 | 9/2013 | Claude et al. | |

FOREIGN PATENT DOCUMENTS

| | | |
|---|---|---|
| EP | 2309449 | 4/2011 |
| WO | 2011120588 A1 | 10/2011 |
| WO | 2013084233 | 6/2013 |

OTHER PUBLICATIONS

European Patent Office; Related PCT/US2014/059185 International Search Report and Written Opinion; dated Feb. 2, 2015; 13 Pages.

* cited by examiner

*Primary Examiner* — Ali Bayat
(74) *Attorney, Agent, or Firm* — IP Spring (57) ABSTRACT

Implementations relate to blurring an image while preserving details in the image. In some implementations, a method includes receiving an input image and creating a blurred image from the input image by averaging pixel intensities of a plurality of pixels in the input image. The method creates a transparency mask from the input image, where the transparency mask indicates transparency values for pixel positions of the input image based on edges detected in the input image. The pixel intensities of the input image and pixel intensities of the blurred image are composited based on the transparency values of the transparency mask to create an output image having greater blur than the input image in areas outside the detected edges.

15 Claims, 8 Drawing Sheets

IMAGE BLUR WITH PRESERVATION OF DETAIL

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. Users of Internet communications can participate in live video chat or teleconferencing, in which visual images of users are captured and sent to various client devices participating in the chat. With the use higher-resolution cameras, more detailed images of users and other subjects can be transmitted. However, many images can include camera noise, skin blemishes and/or imperfections, or other undesired features of image subjects, which many users wish to be removed from an image that is viewed by themselves and other users.

SUMMARY

Implementations of the present application relate to blurring an image while preserving details in the image. In some implementations, a method includes receiving an input image and creating a blurred image from the input image by averaging pixel intensities of a plurality of pixels in the input image. The method creates a transparency mask from the input image, where the transparency mask indicates transparency values for pixel positions of the input image based on edges detected in the input image. The pixel intensities of the input image and pixel intensities of the blurred image are composited based on the transparency values of the transparency mask to create an output image having greater blur than the input image in areas outside the detected edges.

Various implementations and examples of the method are described. For example, creating the blurred image can include using at least one of a box filter and a Gaussian filter. Creating a transparency mask can include detecting the edges in the input image and forming an edge map having pixels at a plurality of different values indicating the edges, blurring the edge map, and mapping values in the blurred edge map to the transparency values. Creating a transparency mask can include inverting the blurred edge map. Blurring the edge map can include using at least one of a box filter and a Gaussian filter on the pixels of the edge map. Mapping values in the blurred edge map to the transparency values can include using a clamped mapping that clamps the transparency values to a predetermined range.

The method can include combining the pixel intensities of the blurred image with the transparency values of the transparency mask that correspond at equivalent pixel positions of the input image, to create a blurred compositing image having the corresponding pixel intensities and transparency values for its pixels, and where compositing the pixel intensities includes compositing the input image and the blurred compositing image. Compositing can be a per-pixel alpha compositing. Detecting the edges in the input image can include performing a differentiation operation on the input image. In some examples, the input image can include one or more faces, and the transparency values indicate that a higher percentage of the blurred image is shown in pixels corresponding to areas of skin of the faces and that a higher percentage of the input image is shown in pixels corresponding to facial landmark features including eyes and mouths of the one or more faces.

A method includes, in some implementations, receiving an input image and creating a blurred image from the input image by averaging color values of a plurality of pixels in the input image. The method detects edges in the input image and forms an edge map having pixels at a plurality of different color values indicating the edges. The edge map is blurred by averaging the color values of the pixels in the edge map, and the pixel values in the blurred edge map are mapped to transparency values to form a transparency mask. The color values of the blurred image are combined with the transparency values of the transparency mask that correspond at equivalent pixel positions of the input image, to create a blurred compositing image having the corresponding color values and transparency values for its pixels. The method composites the color values of the input image and the blurred compositing image based on the transparency values of the transparency mask to create an output image having greater blur than the input image in areas of the input image outside the detected edges.

In various implementations of the above method, creating the blurred image can include using at least one of a box filter and a Gaussian filter. Mapping the pixel values in the blurred edge map to transparency values can include inverting the blurred edge map. Mapping values in the blurred edge map to the transparency values can include using a clamped mapping that clamps the transparency values to a predetermined range. The compositing can be a per-pixel alpha compositing.

In some implementations, a system can include a storage device and at least one processor accessing the storage device and operative to perform operations. The operations include receiving an input image and creating a blurred image from the input image by averaging pixel intensities of a plurality of pixels in the input image. The operations include creating a transparency mask from the input image, where the transparency mask indicates transparency values for pixel positions of the input image based on edges detected in the input image. The operations include compositing the pixel intensities of the input image and pixel intensities of the blurred image based on the transparency values of the transparency mask to create an output image having greater blur than the input image in areas outside the detected edges.

Various implementations of the system can include operations including creating a transparency mask, such as detecting the edges in the input image and forming an edge map having pixels at a plurality of different values indicating the edges, blurring the edge map, and mapping values in the blurred edge map to the transparency values. Creating the blurred image can include using at least one of a box filter and a Gaussian filter. Creating a transparency mask can include inverting the blurred edge map. In some examples, the input image can include one or more faces, and the transparency values indicate that a higher percentage of the blurred image is shown in pixels corresponding to areas of skin of the faces and that a higher percentage of the input image is shown in pixels corresponding to facial landmark features including eyes and mouths of the one or more faces.

DETAILED DESCRIPTION

One or more implementations described herein relate to blurring images while preserving details in the images. In some implementations, a system can create a transparency mask from the input image, which can be used to composite the input image with a blurred image derived from the input image. The transparency mask can indicate higher-detail areas of the input image which are to be displayed using the pixel values of the input image, and can indicate other areas which are to be displayed using the pixels of the blurred image. These and other described features can allow computationally-efficient displayed blurring of images to remove undesirable image features without causing loss of desirable details.

In example implementations, the system can receive an input image and create a blurred image from the input image by averaging pixel intensities of a plurality of pixels in the input image. The system can also create a transparency mask from the input image, where the transparency mask indicates transparency values for pixel positions of the input image based on edges detected in the input image. In some example implementations, the transparency mask can be created by forming an edge map having pixels at a plurality of different values indicating the detected edges, blurring the edge map, and mapping values in the blurred edge map to the transparency values. The system composites the pixel intensities of the input image and pixel intensities the blurred image based on the transparency values of the transparency mask to create an output image having greater blur than the input image in areas outside the detected edges.

Such features can allow blurring in images without losing details. For example, the system can blur skin areas of a face in an image to reduce visual blemishes of the face, without blurring higher detail features desired to be retained, such as edges of facial landmark features including eyes, nose, and mouth. A fast and highly-efficient blurring technique can be used in the creation and display of the blurred image, which can allow significant computational cost savings over previous blurring techniques that preserve details. The features herein can be useful in a variety of applications, including, for example, image processing and display for video chat and other real-time performances.

Figure 1:
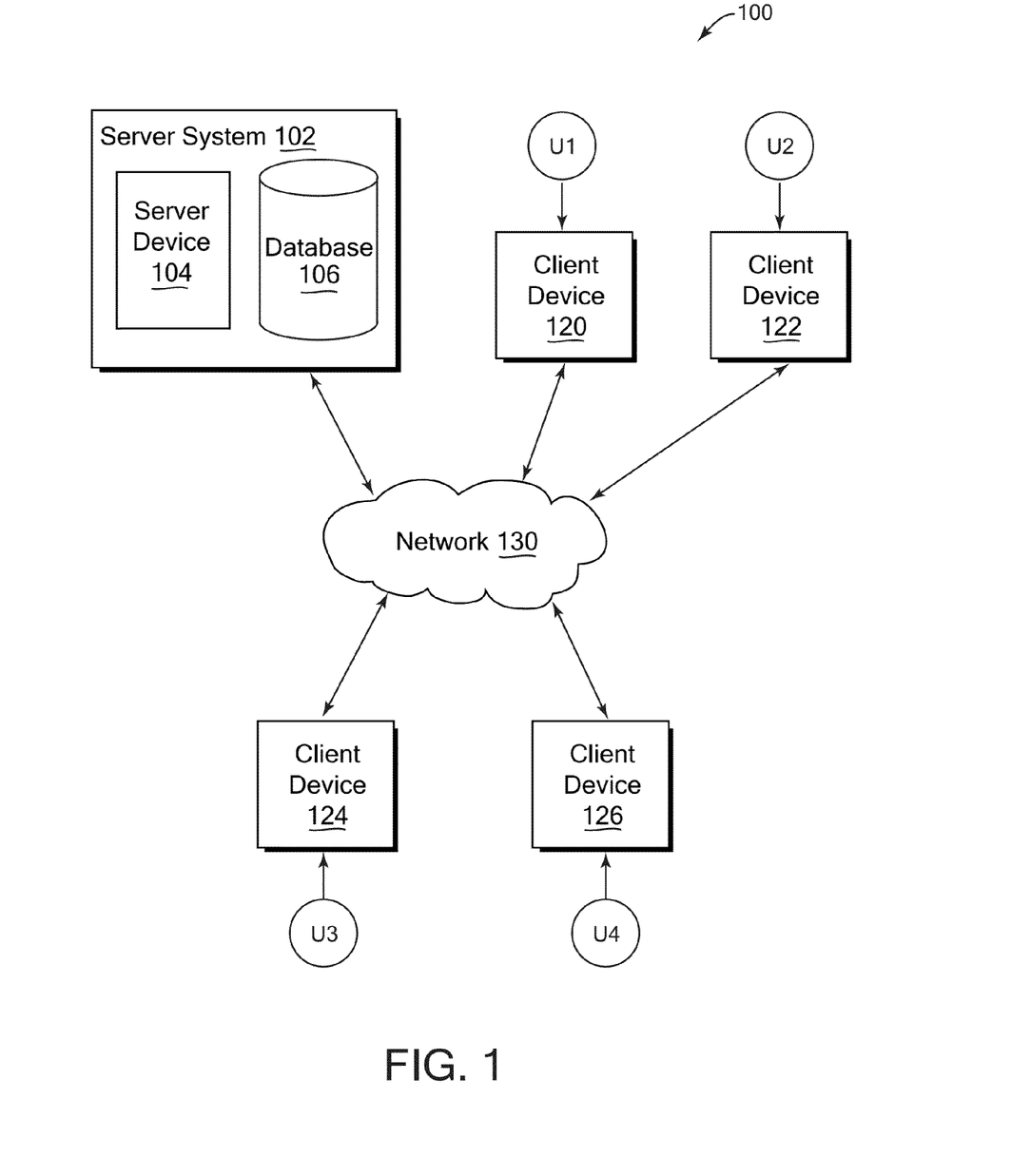
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, display glasses, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat or teleconferencing with other users of the service, etc. As used herein, the term "social networking service" can include a software and/or hardware system that facilitates user interactions, and can include a service implemented on a network system.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
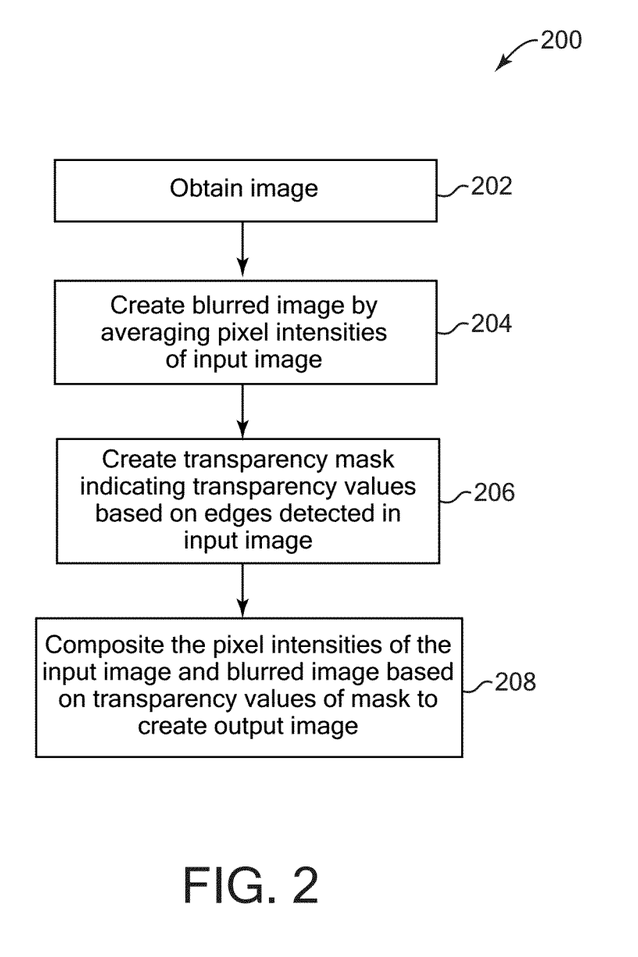
FIG. 2 is a flow diagram illustrating an example method for blurring an image while preserving detail in the image, according to some implementations.

FIG. 2 is a flow diagram illustrating one example of a method 200 for blurring an image while preserving detail in the image. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200. Method 200 can be implemented by program instructions or code, which can be implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, these methods can be implemented in hardware (logic gates, etc.), or in a combination of hardware and software. The method 200 can be performed as part of or component of an application running on the system, or as an application or software running in conjunction with other applications and operating system.

In some implementations, the method 200 can be initiated automatically by a system. In some implementations, the method 200 can be implemented for multiple images (e.g., frames) being provided in video streams. For example, method 200 can be used to blur frames of a video stream being transmitted to a client device to be viewed by a user, e.g., in a one-way transmission. In another example, the method can be used to process captured video frames that are transmitted in a video stream in a multi-way real-time video chat session in which such video streams are being sent to multiple participating client devices. In other examples, the method 200 can be periodically performed, or performed based on a particular event such as one or more original images being newly uploaded to or accessible by the system, or a condition specified in custom preferences of one or more users of the system. In one non-limiting example, a camera, cell phone, or other portable client device can capture one or more images and can perform the method 200. In addition or alternatively, the client device can send captured images to a server over a network, and the server can process the images using method 200. Some implementations can initiate method 200 based on user input. A user may, for example, have selected the initiation of the method 200 from an interface such as a social networking interface, application interface, or other interface.

In block 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. In various implementations, the image can be automatically selected by the method, e.g., as a next image frame in a video stream of data, or as an image from an album or other collection of multiple images such as an album provided in an account of a user of a social networking system. In some implementations, the system can determine which image to obtain based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

In block 204, the method creates a blurred image from the input image by averaging pixel intensities of the input image. For example, in many types of blurring operations, a window of pixels surrounding a given pixel are examined and their intensities are averaged to find a result for the given pixel. This averaging operation can smooth out details, such as skin imperfections visible on faces of people depicted in the input image. Herein, the term "pixel intensities" can refer to values of pixels representing one or more visual pixel characteristics. For example, in a color image the pixel intensities can be red, green, and blue (RGB) values collectively indicating the color and brightness of the associated pixel. In a grayscale image the pixel intensities can be brightness or grayscale values, etc.

In block 206, the method creates a transparency mask indicating transparency values for pixel positions of the input image based on edges detected in the input image. The transparency mask can be determined using any of a variety of edge detection methods as described below. The transparency values each indicate a transparency of the corresponding pixel position of the input image. For example, the transparency values can be specified in a known particular range for such transparency values, such as a value between 0 and 1 for transparent values used in alpha compositing (blending) techniques.

In block 208, the method composites the intensity values of the input image and the intensity values of the blurred image based on the transparency values of the transparency mask to create an output image. The transparency values in the transparency mask vary based on the edge detection performed in creating the transparency mask, and so the compositing can emphasize the intensity values of the input image in higher-detail areas of the input image having detected edges. The compositing can also emphasize the intensity values of the blurred image in areas of the input without edges, thus smoothing those areas. This allows, in an efficient manner, an output image to be produced in which higher-detail areas of the image having edges can remain as they appear in the input image, while areas without edges and which include undesirable features can be smoothed with the efficient blurring operation.

Figure 3:
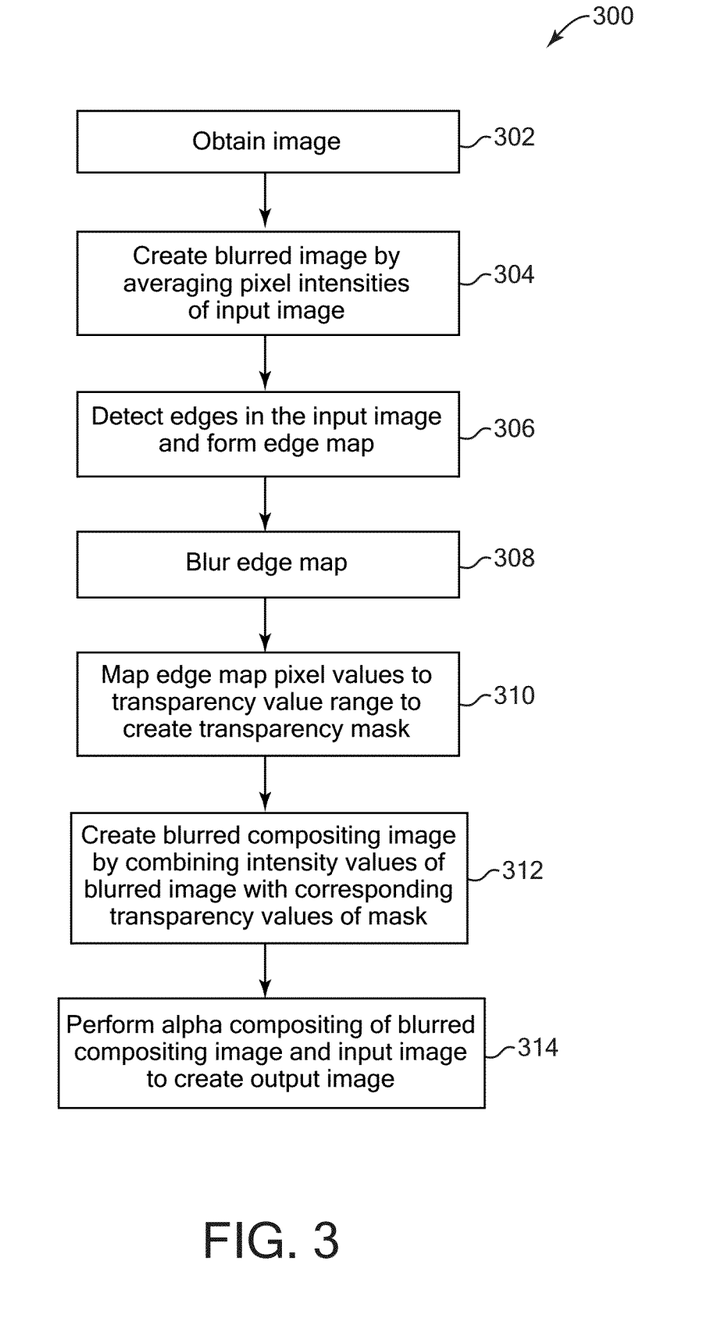
FIG. 3 is a flow diagram illustrating another example method for blurring an image while preserving detail in the image, according to some implementations.

FIG. 3 is a flow diagram illustrating another example method 300 for blurring an image while preserving detail in the image, according to some implementations. Method 300 can be implemented by a system such as a server and/or client device as described above for method 200.

In block 302, the method obtains an image for processing similarly as described above with respect to block 202 of FIG. 2. In block 304, the method creates a blurred image from the input image by averaging pixel intensities of the input image. This can be performed similarly as described above for block 204 of FIG. 2. The pixel intensities can be color values for a color input image in some implementations, such as RGB values, or can be brightness or other pixel values in other implementations (e.g., grayscale images). In some implementations, a linear filter can be used for the blurring operation, such as a box filter in which the filter kernel has the same weights at all its kernel positions. Such a filter is very efficient and fast to perform, which is suitable for live video transmission applications, for example. In some implementations, a Gaussian filter can be used, in which kernel weights fall off from the center of the kernel in an approximately Gaussian fashion. In general, a fast blurring operation is desirable in some implementations to avoid other computationally expensive processes such as a bilateral filter. Some implementations can create a blurred image that corresponds to the entire image area of the input image. Other implementations can create a blurred image that corresponds to a portion of the image area of the input image. Some implementations can blur only particular portions of the input image, such as particular areas of the image that have been detected using facial recognition, object recognition, or other detection techniques.

In some implementations such as video chat or other images in which a person's face is commonly being processed in the input image, the blurring of the input image (e.g., with a linear filter) is not used to reduce noise in the image. This is because blurring and thus removal of image features is not desirable in many applications in which accuracy of the image subjects is important, where noise is desired to be reduced. However, the blur operation can be highly desirable as a way to smooth or remove particular undesired features of the subject(s) of the image that have been accurately depicted, e.g., for faces or other image subjects. For example, accurately-depicted image features as wrinkles, scars, skin pores, or other perceived imperfections of a face can be removed or reduced with the use of the blurring operation described herein.

In block 306, the method detects likely edges in the input image and forms an edge map for the input image. The edges can be detected using any of a variety of techniques. For example, a differentiation operator can be used on the input image, such as a Sobel operator. Other edge detection techniques can alternatively be used, such as Canny edge detection, etc. The created edge map includes an indication of edges, which are discontinuities in pixel intensities within the input image. Edges which extend over larger areas of the image may define features in the image, and such edges can retain all of their detail without smoothing or blurring applied according to features herein, as described below. For example, edges can be detected which define a person's facial landmark features including eyes, eyebrows, nostrils, and mouth, and the edges to these features are desired to retain the sharpness provided in the input image. Other detected edges can define the borders of areas such as heads, faces, objects, horizon, or other areas which will retain detail in the methods described herein. Other areas of the input image that do not have the discontinuities of intensity to form edges will be not be included in the edge map and thus be able to be smoothed or otherwise blurred, such as the cheeks or other areas of skin of a person.

The edge map created in block 306 can have pixel intensities that indicate the presence of edges and the sharpness of those edges. For example, in some implementations a two-dimensional map of the gradient at each point can be used, e.g., for a Sobel operator technique. The edge map can be processed and viewed as though it is an image, with the edge area pixels having one intensity value and the other pixels having a different value. For example, white pixels can indicate edges and black pixels can indicate lack of edges. Other implementations can provide edge pixel values that can take on more than two values, e.g., a continuous range of values indicating the degree of edges. The edge map can extend over the entire area of the input image. In other implementations, the edge map can cover a portion of the input image. Some implementations can detect edges only in particular portions of the input image, such as particular areas of the image that have been detected using facial recognition, object recognition, or other detection or recognition techniques.

In block 308, the method blurs the edge map created in block 306. In some implementations, the blurring can average the pixel intensities over a predetermined area, and can be similar to the blurring technique of block 304, e.g., using the same or different technique(s) as block 304. Block 306 can be performed using any of a variety of blurring techniques, such as a box filter, Gaussian filter, etc. For example, if the edge map includes only two different pixel values of black and white, those values can be converted to a scale having more values, e.g., gray values between the black and white extremes. The blurring of the edge mask effectively widens the areas in the input image that are considered to be edges and high detail. This allows the pixel intensities of a greater area of the original input image (around the detected edges) to be present in the output image, and increasing the amount of edge map blurring correspondingly increases how much of the input image appears through the blurred image as a result of the compositing operation (see block 314). In some implementations, the blurring of the input image in block 304 may produce bleeding artifacts where nearby dissimilar colors are averaged together, producing colors that may look unnatural or out of place. The blurring of the edge map in block 308 can reduce this effect for the output image by effectively widening the areas considered high detail to cover parts of the image where bleeding may be pronounced, so that the input image pixel intensities are more visible in these areas of the output image. In some implementations, the entire edge map can be blurred, while in other implementations, portions of the edge map can be blurred based on particular criteria or areas detected or recognized based any of a variety of techniques.

In block 310, the method maps the pixel values of the edge map to a transparency value range to create the transparency mask. In some implementations, the transparency value range is a particular range in which a value within the range indicates a particular transparency for an associated pixel. In one example, an alpha compositing (alpha blending) technique uses transparency values ranging from 0 to 1, with an extreme or fractional value indicating a percentage of transparency of a foreground image, and where 0 indicates a fully transparent pixel intensity and 1 represents a fully opaque pixel intensity. In such an example, the edge map values can be mapped to the transparency values within the alpha compositing range.

For example, the blurred edge map of block 308 produced by an edge detection technique such as a Sobel operator may have low pixel values (e.g. a color of black) for low-detail areas and higher pixel values (e.g., a color of white) for high-detail areas with edges. In some implementations, the blurred edge map can be inverted such that low pixel values are associated with the high-detail edge areas and high pixel values are associated with low-detail areas, corresponding to low values (transparent) and high values (opaque) of the alpha compositing values.

Furthermore, the edge map values can be subject to a mapping such as a clamped linear mapping that sets the edge map pixel values to transparency values within the desired range at a magnitude within that range that provides the desired corresponding transparency for the pixels. The actual values in the linear mapping used can be dependent on the implementation, can be determined by experimentation. For example, in one example, the clamped linear mapping can be as follows, where E is the (blurred) edge map intensity value for a pixel and T is the corresponding output transparency mask transparency value for that pixel:

$T=1$ for $E<0.04$ $T=-3.65E+1.146$ for $0.04 \leq E \leq 0.314$ $T=0$ for $E>0.314$ Thus, the transparency value T is clamped between 0 and 1 and within that range is proportional to the edge map value by a factor and an added value. Such mapping formulas can vary in different implementations based on the particular edge map values and transparency values used.

In other implementations, the inverting of the edge map can be omitted. For example, the order of composition in block 314 can be reversed so that the input image is the foreground image composited over the blurred image of block 304, in which case the inverting of the edge map is not needed.

In block 312, the method creates a blurred compositing image by combining the intensity values of the blurred image created in block 304 with the corresponding transparency values of the transparency mask determined in block 310. For example, if using alpha compositing in method 300, block 312 can set the alpha channel of each pixel of the blurred image by combining each pixel intensity value (such as RGB values) with the corresponding transparency value from the transparency mask. This creates a blurred compositing image that has pixel intensities of the blurred image and transparency values of the transparency mask.

In block 314, the method performs an alpha compositing operation (e.g., per-pixel alpha blend) of the blurred compositing image with the input image, to create an output image. For example, the transparency value of each pixel in the blurred compositing image is used to determine the amounts of the pixel intensity values of the blurred compositing image and the input image that are visually displayed at that corresponding pixel position in the output image. For example, the blurred compositing image can be used as the foreground image that is composited over the input image, where each transparency value can indicate the percentage of the intensity value of that output image pixel that is to be contributed by the corresponding blurred image intensity value in the blend. In one example, the compositing relation below can be used for each pixel position of the output image:

$O_{red} = (B'_{red} \times \beta'_{alpha}) + (A_{red} \times (1 - B'_{alpha}))$ where O is the output image, A is the input image, and B' is the blurred compositing image. The red channel of the images is shown in this example, and the same relation can be used for green and blue channels of the images, for example.

Thus, the higher-transparency areas of the blurred compositing image cause the input image pixels to be seen in those areas, which are the high-magnitude edges and higher-detail areas of the input image. The lower-transparency areas of the blurred compositing image cause the pixels of the blurred compositing image to be more visible in those areas than the corresponding input image pixels, which are the lower-detail areas (e.g., low edge magnitudes) that the user typically wishes to have blurred.

In other implementations, the input image can be considered the foreground image composited over the blurred image of block 304. For example, in block 312 the transparency values can be combined with the pixel values of the input image rather than with the pixel values of the blurred image, to form an input compositing image. The compositing operation in block 314 can then use the transparency values of the input compositing image (e.g., using the input image as a foreground image) instead of the blurred compositing image. In some implementations, other particular operations can be changed in consequence of using the input image as the foreground image, such as omitting the inverting of the edge map as described above.

The results described above can be adjusted by tuning one or more operations of the method. For example, the blur filter of block 304, the edge detection or differentiation operator of block 306, and/or the mapping or transform used in block 310 can be changed to provide different results.

The above methods 200 and 300 can be implemented in any of a variety of specific ways. For example, in some implementations, the method can write and store a complete image or map result of each (or one or more) of these blocks or operations of the image processing pipeline to separate image or map storage buffers. In other implementations, some or all of the blocks or operations can be performed on an individual pixel-by-pixel basis. For example, a first pixel of the input image can be processed by one or more of the blocks of the method and stored in a buffer, then a second pixel of the input image can be similarly processed, and so on for all the pixels of the input image.

Various blocks and operations of methods 200 and 300 can be performed in a different order than shown and/or at least partially simultaneously, where appropriate. For example, some implementations can perform block 304 at least partially simultaneously with other blocks such as blocks 306, 308, and/or 310. In some implementations, operations can occur multiple times, in a different order, and/or at different times in the methods. In some implementations, the methods 200 and/or 300 can be implemented, for example, on a server system 102 as shown in FIG. 1. In some implementations, one or more client devices can perform one or more blocks instead of or in addition to a server system performing those blocks.

Figure 4A:
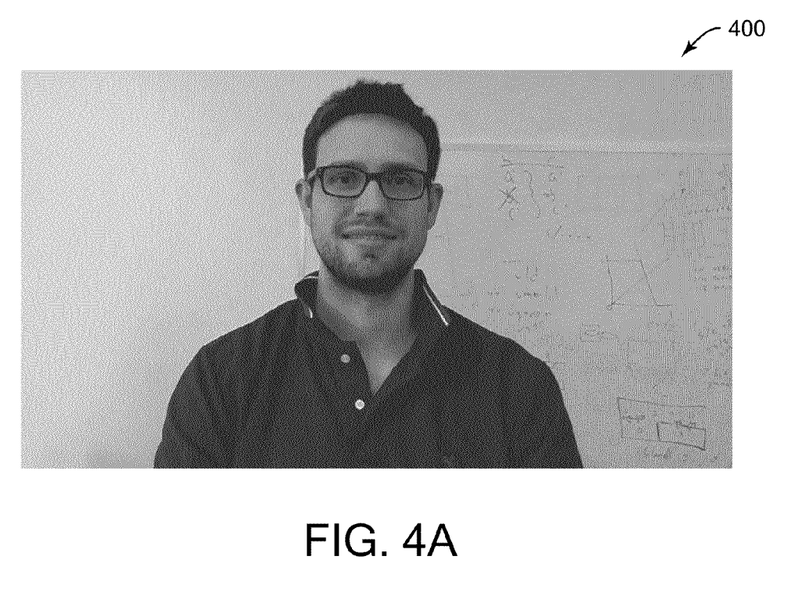
FIGS. 4A-4E are diagrammatic illustrations of example images processed using methods described herein.

FIGS. 4A-4E are diagrammatic illustrations of examples of images processed according to one or more features of the implementations described above to provide a blurred output image that preserves detail. In FIG. 4A, an input image 400 is shown. In some implementations or applications, such as a video chat or teleconference application, image 400 can be captured by a camera at one client device, resized and/or otherwise processed if appropriate, and processed without being displayed by a method 200 or 300 as described herein. This processing can occur on the capturing device, on a different or receiving client device, and/or on a server device. The blurred output image resulting from the processing can be sent to and/or displayed at one or more client devices participating in the video chat. In other implementations, the input image 400 can be received from another source (e.g., memory or other storage, etc.) and processed by a client or server device. In some implementations, the input image 400 can be displayed on a display device, e.g., of a client device 120, 122, 124, and/or 126 of FIG. 1, or a server system 102 in some implementations. In this example, input image 400 depicts a face of a person and is to be processed according to features described herein.

Figure 4B:
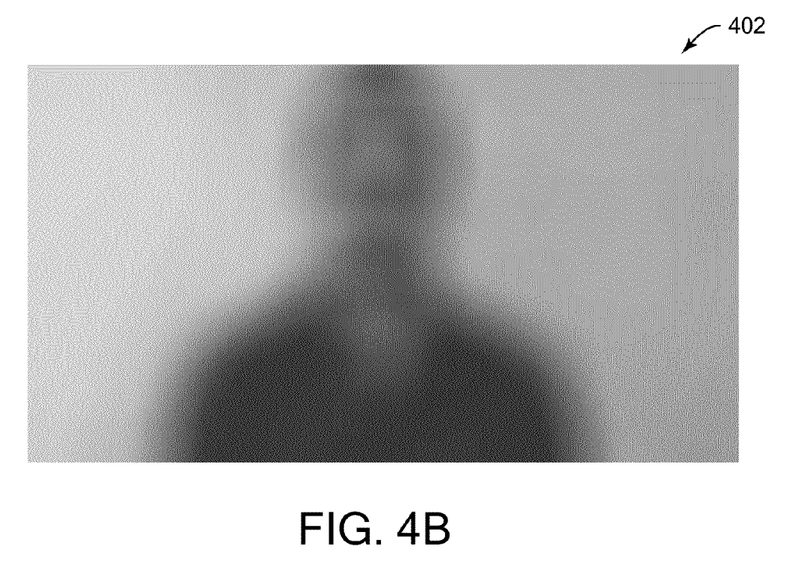

In FIG. 4B, a blurred image 402 is shown, which has been derived from the input image 400 shown in FIG. 4A. Blurred image 402 corresponds to the entire input image 400 that has been blurred to smooth out its details, as described above. In some examples, the blur can be used to smooth out undesirable features in a person's face, such as wrinkles, skin pores, scars, or other perceived imperfections in a person's face, or smooth out undesirable features in other image subjects.

Figure 4C:
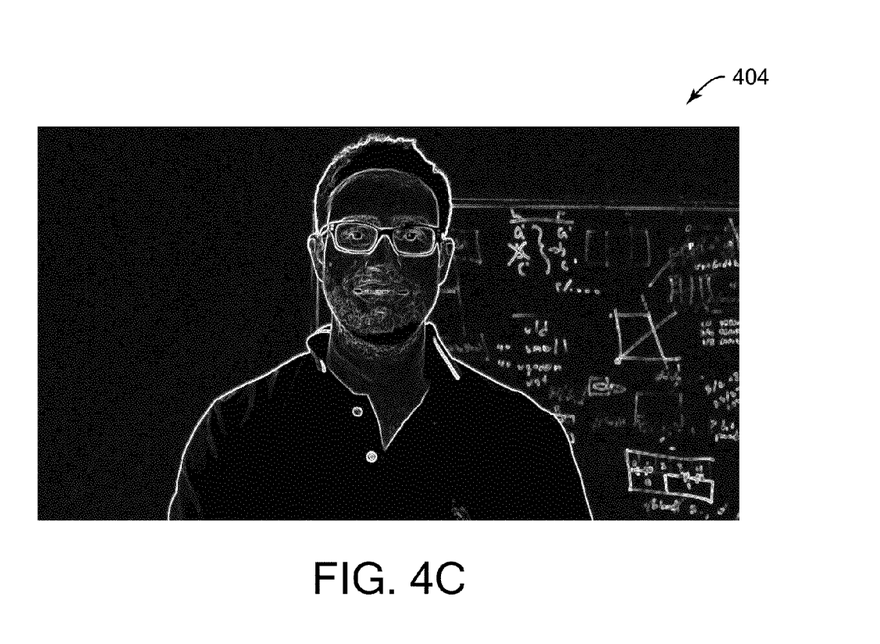

In FIG. 4C, an edge map 404 is shown, which has been derived from the input image 400 shown in FIG. 4A. For example, as described above, an edge detection technique can be used, such as a technique using a differentiation operator, to find edges in input image 400. In this example, such edges correspond to the outlines of the face and torso of the person depicted in the input image. In addition, edges have been detected in and around the eyes, eyebrows, nose outlines, and mouth outlines of the depicted face. These are facial landmark features that are typically not desired to be blurred, since such blurring might, for example, reduce the recognizability and identity of the person and of the expressions of the face. Furthermore, edges have been detected for writing on a board in the background, which may be desirable to maintain in detail. In the example edge map 404, the edge map 404 covers the entire input image 400, where the detected edges are shown as white (high pixel intensity values) and the non-edge areas are shown as black (low pixel intensity values).

Figure 4D:
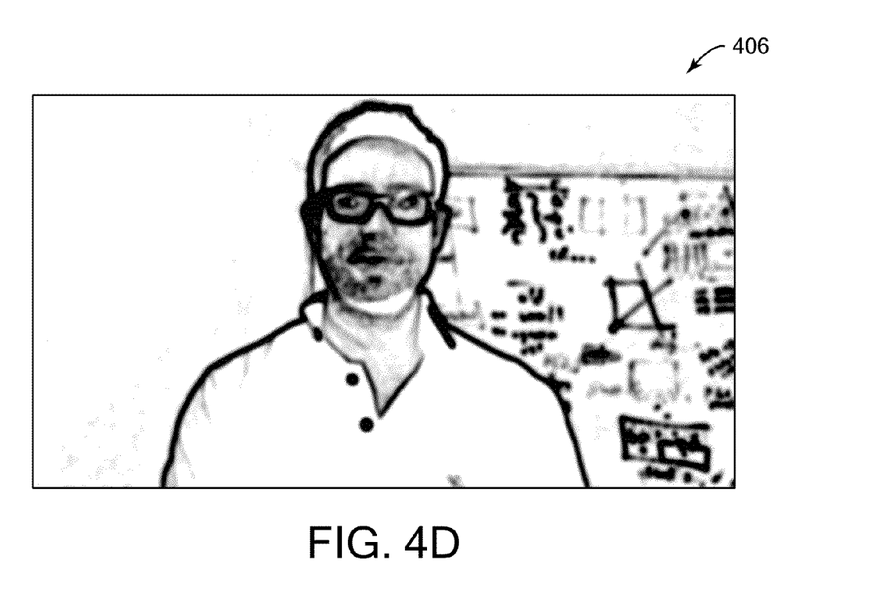

In FIG. 4D, a transparency mask 406 is shown, which has been derived from the edge map 404 of FIG. 4C. The transparency mask pixel values are mapped to a range of transparency values to be used in a compositing technique later in the method. In this example, the transparency mask 406 is created by blurring the edge map 404, inverting the blurred edge map, and mapping the values of the blurred and inverted edge map to the transparency value range. In the example transparency mask 406 shown in FIG. 4D, the pixel intensity values are not actual transparency values (e.g., in a transparency value range of 0 to 1) and are shown as equivalent values (e.g., in an equivalent range of 0-255) so that the mask can be shown as an image for illustrative purposes. In the example implementation, the (blurred) edge regions are shown as darker regions having lower pixel intensity (transparency) values and the non-edge areas are shown as lighter or white regions having higher pixel intensity (transparency) values, for some implementations in which a lower transparency value indicates greater transparency.

The intensity values shown in the transparency mask 406 have been mapped to the actual transparency values of the transparency mask. The blurred image 402 of FIG. 4B can then be combined with the transparency values of the transparency mask 406 to create a blurred compositing image, as described above with reference to FIG. 3. For example, the transparency value at each location (x, y) of the transparency mask 406 (e.g., the R, G, or B value of that location of the transparency mask, where the RGB values are equal to each other) is copied to the alpha channel value of the blurred image 402 at the corresponding locations (x, y). The blurred compositing image has the same visual appearance as the blurred image 404, since the added transparency values (e.g., alpha compositing channel values) have not been used in the display of the blurred compositing image.

Figure 4E:
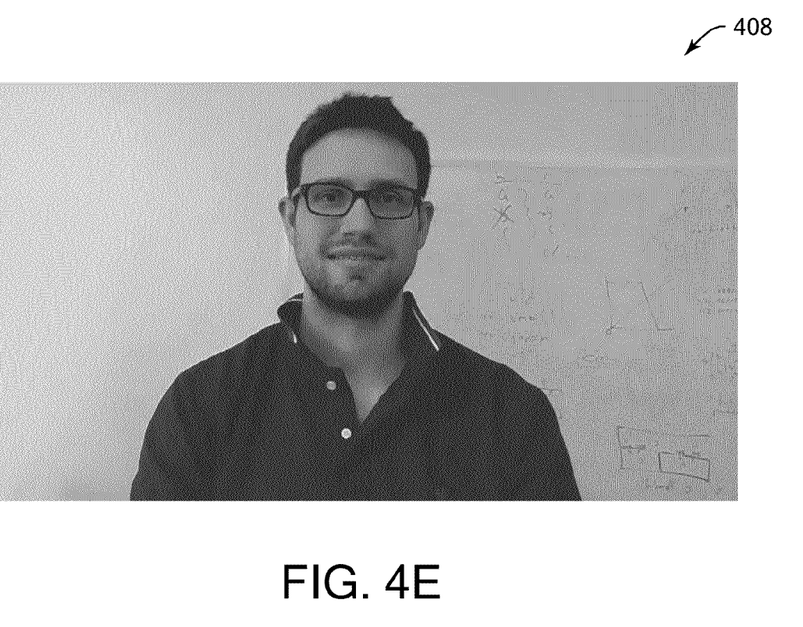

In FIG. 4E, an output image 408 is shown, which has been derived from the blurred compositing image described above and the input image 400 of FIG. 4A. The blurred compositing image is composited with the input image, where the transparency values of the blurred compositing image are used to determine how much of the pixel values from each of these images is the appear in the output image. The high-magnitude edge areas having low transparency values in the blurred compositing image provide the blurred pixels with a greater amount of transparency so that the input image pixel values can mostly or fully be seen in these high-detail areas. The non- or low-magnitude edge areas having high transparency values provide those pixels with a lesser amount of transparency (greater opacity) so that the blurred pixel values can be seen in those areas. Thus, areas with edges such as the glasses on the face, borders of image facial features such as face, mouth, eyes, ears, hairline, etc., and other image features such as writing in the background, have been displayed with the detail of the original image, while other flat, single-colored, and skin areas have been displayed as more of the blurred image pixel intensities. In one non-limiting example, a user can view output image 408 displayed by a display device in a graphical interface provided by a client device or server device.

Figure 5:
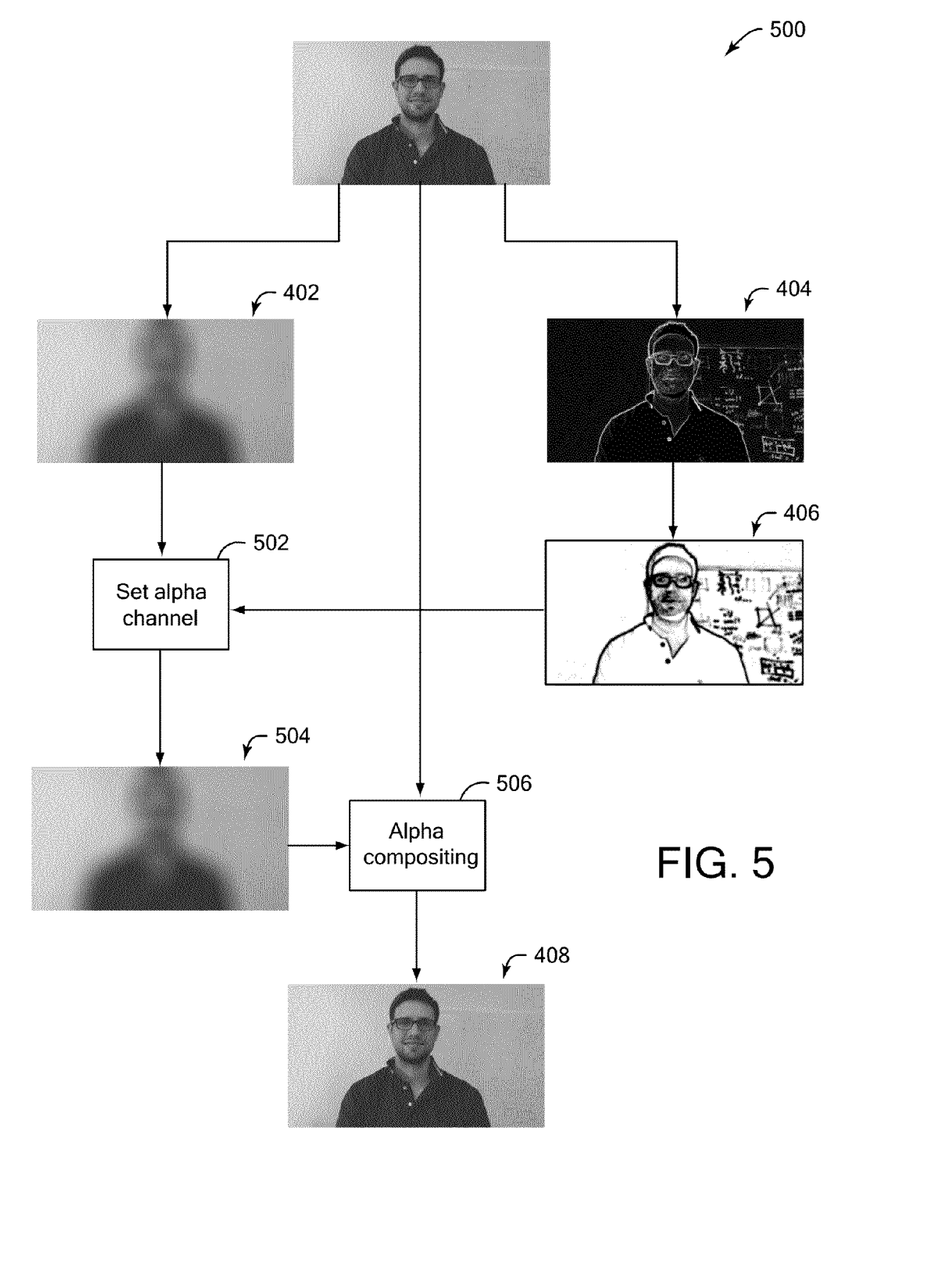
FIG. 5 is a block diagram illustrating an example implementation of the method of FIG. 3 using images of FIGS. 4A-4E.

FIG. 5 is a block diagram illustrating an example implementation of the method of FIG. 3, using the images shown in FIGS. 4A-4E. The input image 400 is used to provide blurred image 402 and edge map 404. The transparency mask 406 is provided from the edge map 404. The transparency mask 404 is used to set the alpha channel of blurred image 402 in operation 502, resulting in the blurred compositing image 504 that includes the pixel intensities of blurred image 402 and the transparency values of mask 406. The blurred compositing image 504 and the input image 400 are alpha composited in operation 506 to provide the output image 408.

Figure 6:
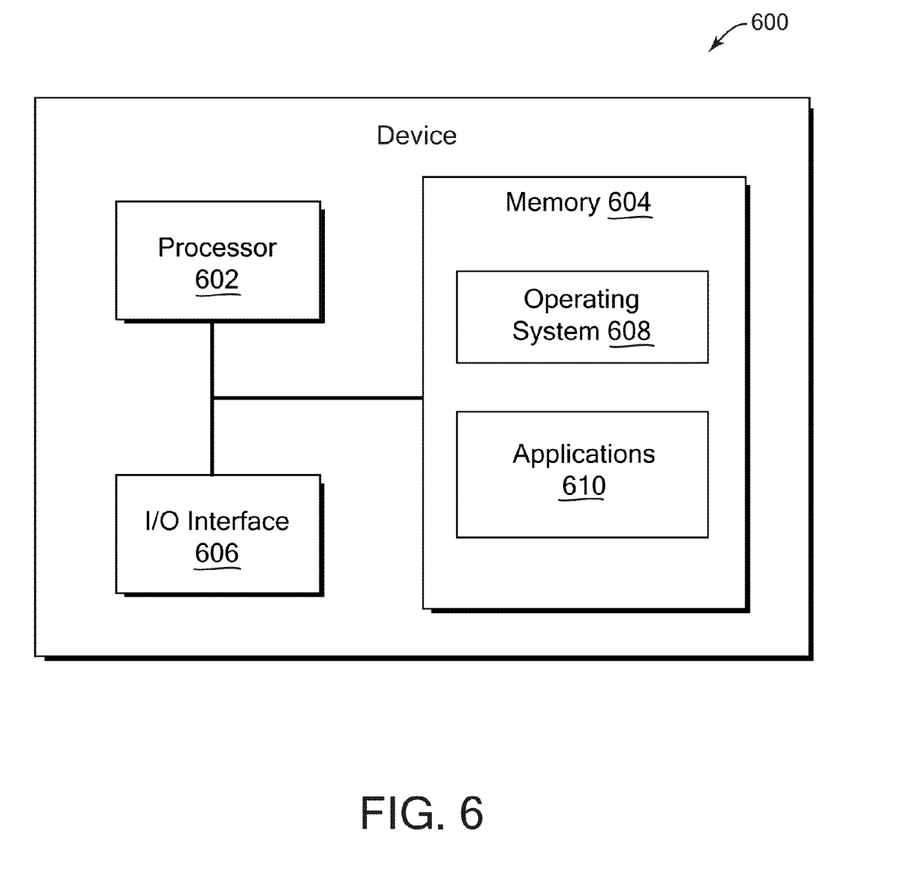
FIG. 6 is a block diagram of an example device which may be used for one or more implementations described herein.

FIG. 6 is a block diagram of an example device 600 which may be used to implement some implementations described herein. In one example, device 600 may be used to implement server device 104 of FIG. 1, and perform appropriate method implementations described herein. Server device 600 can be any suitable computer system, server, or other electronic or hardware device. For example, the server device 600 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608 and one or more applications engines 610 such as a graphics editing engine, web hosting engine, social networking engine, etc. In some implementations, the applications engines 610 can include instructions that enable processor 602 to perform the functions described herein, e.g., some or all of the methods of FIGS. 2 and/or 3. Any of software in memory 604 can alternatively be stored on any other suitable storage location or computer-readable medium. In addition, memory 604 (and/or other connected storage device(s)) can store images, sample blocks, color bins, data structures, and other data used in the features described herein. Memory 604 and any other type of storage (magnetic disk, optical disk, magnetic tape, or other tangible media) can be considered "storage devices."

I/O interface 606 can provide functions to enable interfacing the server device 600 with other systems and devices. For example, network communication devices, storage devices such as memory and/or database 106, and input/output devices can communicate via interface 606. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, server device 600 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 600, such as processor(s) 602, memory 604, and I/O interface 606. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
    receiving an input image;
    creating a blurred image from the input image by averaging pixel intensities of a plurality of pixels in the input image;
    creating a transparency mask from the input image, the transparency mask indicating transparency values for pixel positions of the input image based on edges detected in the input image, wherein creating the transparency mask includes:
        detecting the edges in the input image and forming an edge map having pixels at a plurality of different values indicating the edges;
        blurring the edge map; and
        determining the transparency values based on the blurred edge map; and
    compositing the pixel intensities of the input image and pixel intensities of the blurred image based on the transparency values of the transparency mask to create an output image having greater blur than the input image in areas outside the detected edges.

2. The method of claim 1 wherein creating the blurred image includes using at least one of a box filter and a Gaussian filter.

3. The method of claim 1 wherein determining the transparency values includes
    mapping values in the blurred edge map to the transparency values.

4. The method of claim 3 wherein mapping values in the blurred edge map to the transparency values includes using a clamped mapping that clamps the transparency values to a predetermined range.

5. The method of claim 1 further comprising combining the pixel intensities of the blurred image with the transparency values of the transparency mask that correspond at equivalent pixel positions of the input image to create a blurred compositing image having the corresponding pixel intensities and transparency values for the pixels of the blurred compositing image, and
    wherein compositing the pixel intensities of the input image and pixel intensities of the blurred image includes compositing the input image and the blurred compositing image.

6. The method of claim 1 wherein creating the transparency mask includes inverting the blurred edge map.

7. The method of claim 1 wherein blurring the edge map includes using at least one of a box filter and a Gaussian filter on the pixels of the edge map.

8. The method of claim 3 wherein detecting the edges in the input image includes performing a differentiation operation on the input image.

9. The method of claim 1 wherein the compositing is a per-pixel alpha compositing.

10. The method of claim 1 wherein the input image includes one or more faces, and wherein the transparency values indicate that a higher percentage of the blurred image is shown in pixels corresponding to areas of skin of the one or more faces and that a higher percentage of the input image is shown in pixels corresponding to facial landmark features including eyes and mouths of the one or more faces.

11. A system comprising:
   a storage device; and
   at least one processor accessing the storage device and operative to perform operations comprising:
   receiving an input image;
   creating a blurred image from the input image by averaging pixel intensities of a plurality of pixels in the input image;
   creating a transparency mask from the input image, the transparency mask indicating transparency values for pixel positions of the input image based on edges detected in the input image, wherein creating the transparency mask includes:
      detecting the edges in the input image and forming an edge map having pixels at a plurality of different values indicating the edges;
      blurring the edge map; and
      determining the transparency values based on the blurred edge map; and
   compositing the pixel intensities of the input image and pixel intensities the blurred image based on the transparency values of the transparency mask to create an output image having greater blur than the input image in areas outside the detected edges.

12. The system of claim 11 wherein creating the blurred image includes using at least one of a box filter and a Gaussian filter.

13. The system of claim 11 wherein determining the transparency values includes
   mapping values in the blurred edge map to the transparency values.

14. The system of claim 11 wherein creating the transparency mask includes inverting the blurred edge map.

15. The system of claim 11 wherein the input image includes one or more faces, and wherein the transparency values indicate that a higher percentage of the blurred image is shown in pixels corresponding to areas of skin of the one or more faces and that a higher percentage of the input image is shown in pixels corresponding to facial landmark features including eyes and mouths of the one or more faces.

* * * * *